March 11, 1952  W. P. WILLS  2,588,678
MEASURING AND CONTROLLING APPARATUS
Filed Dec. 19, 1947

*INVENTOR.*
WALTER P. WILLS
BY Arthur H. Swanson
ATTORNEY

Patented Mar. 11, 1952

2,588,678

UNITED STATES PATENT OFFICE 2,588,678

MEASURING AND CONTROLLING APPARATUS

Walter P. Wills, Philadelphia, Pa., assignor, by mesne assignments, to Minneapolis-Honeywell Regulator Company, Minneapolis, Minn., a corporation of Delaware Application December 19, 1947, Serial No. 792,657

4 Claims. (Cl. 137—153)

The general object of the present invention is to provide improved apparatus for measuring a variable pressure, and for creating a control force varying with said pressure. My improved apparatus comprises means for balancing the pressure measured by an air pressure which is varied by the adjustment of a flapper valve relative to a bleed nozzle on and in accordance with variations in the pressure to be measured. The said valve and nozzle cooperate to vary the nozzle pressure in the same general manner in which the flapper valve and nozzle of an air controller of conventional type cooperate to vary a control pressure, but my invention comprises novel means for adjusting the flapper relative to the nozzle in response to variations in the pressure to be measured.

In the preferred form of the invention, the pressure balancing means comprises an expansible pressure chamber to which the pressure to be measured is transmitted and a second expansible chamber to which the balancing pressure is transmitted. The two chambers are so constructed and arranged that the expansion and contraction of each is attended by the contraction and expansion, respectively, of the other. In the desirable form of the invention illustrated herein by way of example, the two chambers are separated by a common movable partition wall and the movements of the latter effect the flapper valve adjustments required to vary the balancing air pressure on and in accordance with variations in the pressure to be measured.

The movement relative to the bleed orifice of the nozzle, of the adjacent portion of the associated flapper valve required for the variation of the balancing pressure between its minimum and maximum values, is of the minute extent characteristic of conventional air controllers. Ordinarily, that movement does not exceed four thousandths of an inch, while the corresponding movement of the partition wall separating the measuring and pressure chambers may well be from two to four-tenths of an inch. The primary object of the present invention is to provide a simple and effective mechanical linkage through which the relatively large movements of the movable wall of the pressure measuring chamber effects the relatively minute throttling movements of the portion of the flapper valve adjacent the nozzle bleed orifice. A more specific object of the invention is to provide a mechanical linkage which not only gives the flapper valve its minute adjustment, but also deflects the pen arm or pointer of an instrument for recording or indicating the varying value of the pressure to be measured.

A still more specific object of the invention is to provide a mechanical linkage for the above stated purposes, comprising means operating on a change in the value of the pressure to be measured, to oscillate the flapper valve about a pivot to an extent and in a direction depending on the extent of direction of change of said value, and for simultaneously angularly adjusting the pivot in the opposite direction relative to the bleed nozzle orifice.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 1:
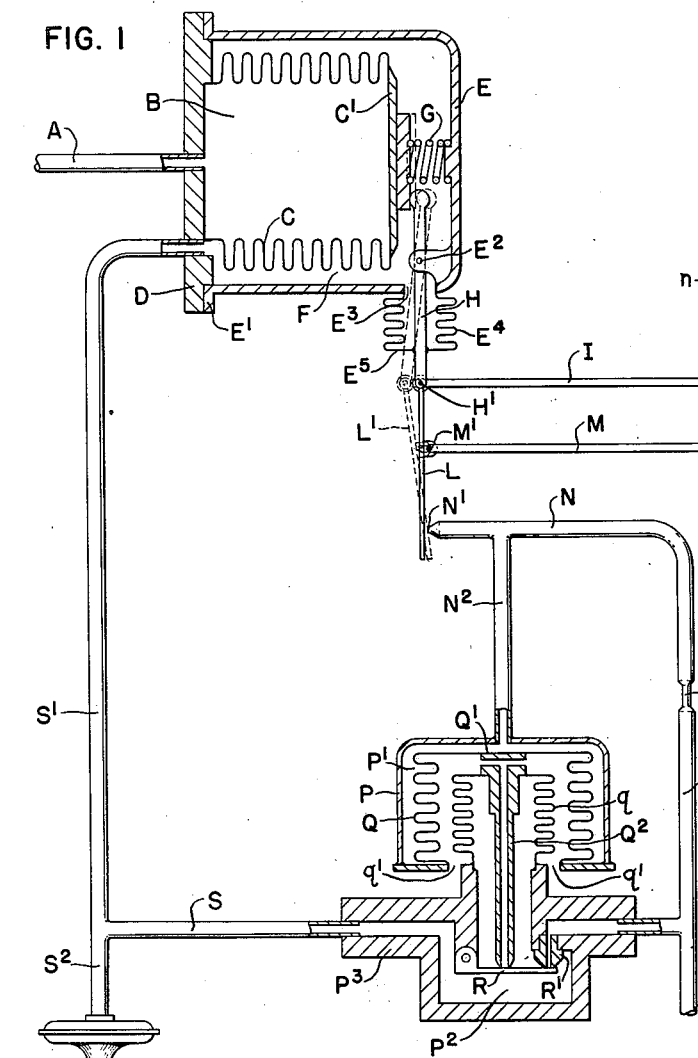
Fig. 1 is a somewhat diagrammatic sectional elevation of apparatus embodying the present invention.

In the apparatus shown diagrammatically in Fig. 1 by way of example, the pressure to be measured is transmitted by a pipe A to a pressure chamber B. The latter has a movable wall comprising a tubular bellows element C connected at one end to a stiffened movable end wall member C', and connected at its other end to a rigid, platelike support D formed with an aperture through which the pipe A opens into the chamber B. A rigid cup-shaped casing member E encloses a pressure chamber F enveloping the bellows element C and its movable end wall C'. The casing member E is formed with a peripheral rim flange E' which abuts against and is secured to the support D. The latter forms one end of an annular portion of the pressure chamber F surrounding the bellows element C. Normally, the bellows element C is a corrugated tubular body of resilient metal and has an inherent bias against elongation or contraction. As shown, a helical bias spring G in the chamber F, acts between the bellows end wall t' and the adjacent end wall of the rigid casing member E. The bias forces acting on the end wall C', prevent excessive elongation or contraction of the bellows element under abnormal conditions, but no such biasing forces are needed for the measuring and force balancing functions of the apparatus.

A lever H extending transversely to the axis of the bellows element C has one end in engagement with the side of the bellows end wall C' remote from the chamber B. The lever H is pivoted to turn about a pivot pin $E^2$ within the chamber F, and carried by a bracket portion of the casing member E. An opening $E^3$ is formed in the rigid casing member E for the passage of the lever H. Air leakage through the opening $E^3$ is prevented by a seal comprising a tubular, corrugated bellows element $E^4$ having one end secured to the casing element E at the margin of the opening $E^3$ and having its other end closed by an end member $E^5$. The lever H extends through the central portion of the end member $E^5$ and may be brazed or soldered to the latter.

The external end of the lever H is pivotally connected by a pivot H' to one end of a link I which has its other end pivotally connected to a deflecting element J by a pivot J'. The latter is pivoted to turn about a pivot pin K' carried by a stationary bracket K. The free end $J^2$ of the member J may carry a recording pen for recording the value of the pressure in the chamber B, but as shown, the member J acts as an indicating pointer deflecting along a scale $J^3$.

In a normal intermediate condition of the apparatus, the lever H and deflecting element J are substantially parallel and the link I is approximately perpendicular to said lever and element. An elongated flapper valve L is pivotally connected to the lever H and to the link I by the pivot H', and is connected by a pivot M' to one end of a link M, which has its other end connected to the deflecting member J by a pivot $M^2$. The pivots $E^2$, H', J', K', M' and $M^2$ are all parallel, and in the preferred form shown, the links I and M are of equal length, and the pivots H', J', M' and $M^2$ are connected and arranged to form a parallel motion linkage by which the flapper valve L is moved toward and away from the bleed orifice N' at the free end of a bleed nozzle N in accordance with variations in the pressure in the chamber B. The nozzle N is connected to a compressed air supply pipe O through a restricted passage O'. The pipe O receives air from a source of air under an approximate constant pressure, for example seventeen pounds per square inch, such as is commonly employed in air control apparatus. The pressure in the nozzle N varies from a minimum but little above the pressure of the atmosphere to a maximum but little below the pressure in the supply pipe as the distance between the flapper and the discharge end of the bleed orifice N' is progressively decreased from an initial flapper position in which the flapper does not significantly restrict the discharge through the orifice N'.

The pressure in the bleed nozzle N is transmitted through the pipe connection $N^2$ to the input pressure chamber P' of a pilot valve P. As shown, the latter is of well known type and includes an output pressure chamber $P^2$ and means normally maintaining an output pressure in the chamber $P^2$ in predetermined proportion to the nozzle pressure transmitted to the input chamber P'. The input pressure chamber P' is enclosed by a rigid casing comprising an inverted cup-shaped member and a base portion $P^3$ to which the lower end of said cup-shaped member is attached. The input pressure chamber P' has a movable wall portion comprising a tubular bellows element Q within the space surrounded by the cup-shaped casing member, and connected at its lower end to the base member $P^3$. The upper end of the bellows element Q is connected to a stiff movable end wall Q' which also serves as the movable end wall for a coaxial tubular bellows element $q$, smaller in diameter than the bellows element Q and having its lower end attached to the base member $P^3$. The space between the two bellows elements Q and $q$ is open to the atmosphere at its lower end through ports $q'$, and communicates with the output chamber $P^2$ through a tubular nozzle element $Q^2$ when the pressure in the output chamber P' decreases relative to the pressure in the chamber $P^2$. The tubular nozzle $Q^2$ is supported by and depends from the movable wall Q'.

When the wall Q' moves upward from its normal position, occupied when the input and output pressures are properly related, the lower end of the nozzle $Q^2$ moves out of engagement with the flapper valve R. Air then flows through the bore of the nozzle $Q^2$ from the output chamber $P^2$ into the space between the bellows elements Q and $q$, and thence into the atmosphere through the ports $q'$. The flapper valve R is mounted in the chamber $P^2$ to turn into and out of engagement with the lower end of a nozzle R' through which air under pressure passes into the chamber $P^2$ from the pipe O when the discharge end of the nozzle R' is not closed by the flapper valve R. On an increase in the pilot valve input pressure relative to its output pressure, the bellows end wall Q' moves upward, and the nozzle $Q^2$ then moves the flapper valve R out of engagement with the nozzle R' and thus permits air to flow into the output chamber $P^2$ and increase the pressure in the latter. In the normal position of the flapper valve R, when the input and output pressures are in the desired relation, the flapper R is held by biasing means, not shown, in the position in which it closes the passage through the nozzle R' and closes the passage through the nozzle $Q^2$. As will be apparent, the pilot valve P thus operates in a well-known manner to maintain an output pressure in the chamber $P^2$ greater than, and in predetermined proportion to the input pressure in the chamber P'.

The pilot valve output pressure is transmitted through a pipe S and a branch pipe S' to the pressure chamber F. As shown, the output pressure is also transmitted through the pipe S and branch pipe $S^2$ to a control device T, shown as a diaphragm regulator valve.

In operation, as the pressure transmitted to the chamber B through the pipe A increases or decreases, it produces a resultant expansion or contraction, respectively, of the bellows C and a corresponding clockwise or counter-clockwise adjustment of the lever H. In the form shown, the bleed nozzle N is parallel to the axis of the chamber B and is substantially perpendicular to the aligned flapper valve L and lever H when the parts are in such relative position that the pointer J is in the position in which its free end is approximately midway between the ends of the scale $J^2$, as shown in full lines in Fig. 1. On a clockwise or counter-clockwise deflection of the lever H, the latter operates through the link I to adjust the pointer J in the counterclockwise or clockwise direction, respectively. With the links I and M proportioned and arranged as described, the flapper L is maintained in approximate parallelism with the pointer J in all positions of the latter. Furthermore, the various pivots are so spaced and arranged that as the member J deflects counter-clockwise and thus moves toward the higher end of the scale J², the flapper L approaches the orifice N', and as the member J deflects toward the low end of the scale, the flapper L moves away from the nozzle N.

Figure 2:
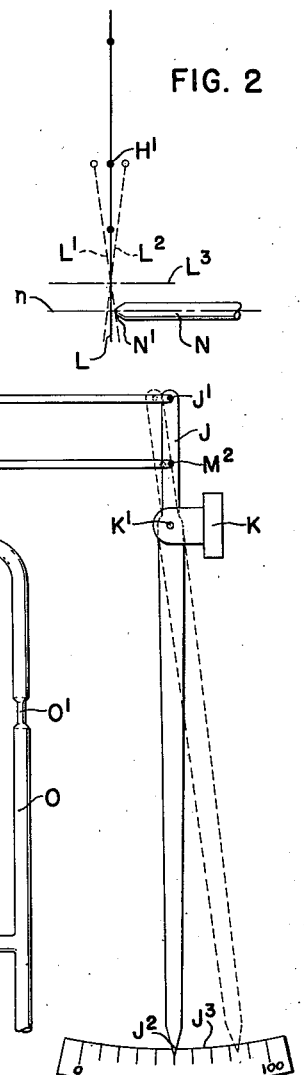
Fig. 2 is a diagram illustrating different relative positions of the flapper valve and associated bleed nozzle elements of Fig. 1.

The described movements of the flapper relative to the discharge end of the nozzle orifice N are within an operative range which ordinarily is of the order of .004 of an inch. That range may well be not more than one percent of the range of arcuate movement of the pivot H' from which the flapper valve is suspended. Notwithstanding the substantial range of movement of the pivot H', the movement of the portion of the flapper L in position to variably throttle the orifice N', is kept suitably minute because the last mentioned movement is the resultant of two angular movements in opposite directions. One of the two angular movements is the angular movement of the pivot H' in a clockwise or counter-clockwise direction about the pivot E² on an increase or decrease, respectively, in the pressure in the chamber B, and the second angular movement is a counterclockwise or clockwise movement, respectively, of the flapper L about the pivot H'. In Fig. 2, the dotted lines L' and L² show the positions of the flapper L which correspond respectively to the positions of the pointer J when the latter is at the high and low ends, respectively, of the scale J². When the apparatus is so adjusted that the axes of the pivots E², H and M' are all in the same vertical plane, as shown in full lines in Fig. 1, the free end J² of the pointer J is at the midpoint of the scale J³. The apparatus may well be so proportioned and calibrated that the pressure then maintained in the nozzle N is equal to the average of the maximum and minimum nozzle pressures, i. e., equal to 7½ p. s. i., if the maximum and minimum nozzle pressures are 16 p. s. i. and 1 p s. i., respectively.

As the pivot H' moves to the left from its position shown in full lines in Fig. 1, its connection through the link M to the pointer J causes the flapper to turn counter-clockwise, as seen in Fig. 1, about the pivot H'. With the parts proportioned and arranged as shown in Fig. 1, on a movement of the pivot H' to the left of its full line position, the portion of the flapper valve L immediately in front of the nozzle orifice N', moves toward the nozzle and thus increases the nozzle pressure. When the pressure in the chamber B is reduced below its normal or average value, the pivot pin H' is displaced to the right of the vertical plane including the axis of the pivot E², and the free end J² of the deflecting element J then approaches the left hand end of the scale J³, and the flapper L then moves into a position far enough away from the discharge end of the orifice N to have no significant throttling action of the flow through the orifice. In consequence, the pressure in the nozzle N then attains its minimum operational value.

The attainment of the desired movement of the valve member L in response to a pressure change in the chamber B, requires a suitable relation between the lever and linkage elements through which the movement of the wall C varies the distance between the orifice N' and the throttling portion portion of the valve member L. With the lever and link arrangement of the form shown in Fig. 1, the only linkage dimensions which need to be precisely related are the angular deflections of the member J, the distance between the pivots J' and K' and the distance between the pivot H' and the axis $n$ of the orifice N'. The angular movement of the element J for full scale deflection depends upon the distance between the pivots J' and K', and on the extent of movement of the pivot H' along its arcuate path. The angular movements of the pivots H' and J' are so relatively small in comparison with the distances between the pivots K and J' and between the pivots H' and E², that the divergence from the horizontal of the path of movement of each of said pivots is without practical significance. With the links I and M equal in length and parallel, the vertical distance between the links is unimportant. Regardless of the actual value of that distance, the two links are adapted to maintain the flapper L and deflecting element J in parallelism with one another.

As Fig. 2 plainly indicates, the minimum distance between the outlet end of the orifice N' and the flapper valve L is directly dependent upon the vertical distance between the discharge end of the orifice N' and the horizontal line L³ passing through the point at which the dotted lines L' and L² intersect one another and the flapper L when the latter is in its position indicated in full lines in Figs. 1 and 2. The effect of an adjustment which raises or lowers the line L³, is to respectively increase or decrease the extent of movement of the flapper from the nozzle orifice N' for a given horizontal movement of the pivot H'. When the relative positions of the nozzle N and pivot E², and the distance between the pivots E² and H' are constant, the distance between the axis $n$ of the nozzle N and the line L³ is directly dependent on the distance between the pivots J' and K' and is increased or decreased as the distance between said pivots is decreased and increased. Subject to the critical relation between the extent of arcuate movement of the pivot H', the distance between the pivots J' and K', and the distance between the pivot H' and the axis $n$, the arrangement and dimensions of the linkage elements may be modified in accordance with the conditions of use or with the desire of the designer.

The reference hereinbefore made to the vertical and horizontal positions and movements of parts, are to be understood as made only to simplify the description of the apparatus shown in Fig. 1. In practice, the apparatus will operate equally well with the apparatus bodily adjusted so that the axis of the nozzle N is vertical, or is inclined at an acute angle to the horizontal. It is to be understood, also, that while links I and M and the portions of the flapper valve L and deflecting eleent J connected by said links, are advantageously proportioned to form a true parallel motion linkage, only approximate parallelism of the links I and M, and approximate parallelism of the link connecting portions of the flapper L and element J are practically essential.

Figure 3:
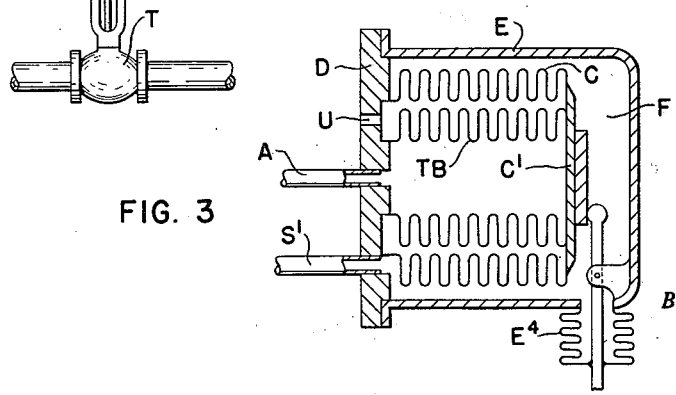
Fig. 3 is a sectional elevation of a modification of a portion of the apparatus shown in Fig. 1.

When the apparatus shown in Fig. 1 is in its normal balanced condition, the measured pressure per square inch in the chamber B and the balancing pressure per square inch in the chamber F are equal. In some cases, however, the pressure per square inch to be measured may be substantially greater than the balancing pressure desirably employed. In such case, use may be made of pressure balancing mechanism of the character shown in Fig. 3, in which the chamber B to which the pressure to be measured is transmitted, is surrounded by a corrugated tubular bellows element T smaller in diameter than the bellows C and coaxial with and within the latter. The space between the bellows C and T is in free communication with the atmosphere through a vent or port U. With the arrangement shown in Fig. 3, the ratio of the pressure per square inch in the chamber B to the balancing pressure per square inch in the chamber F is the same as the ratio of the cross-sectional area of the bellows C to the cross-sectional area of the bellows T.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described by invention, what I claim as new and desire to secure by Letters Patent, is:

1. Pressure measuring apparatus comprising in combination, a first pressure chamber in which the pressure to be measured is maintained, a second expansible chamber, said chambers being so arranged that the expansion of each is attended by the contraction of the other, and mechanism for maintaining a balancing air pressure in said second chamber which increases and decreases as the first chamber expands and contracts, comprising a bleed nozzle connected through a restricted flow passage to a source of air under pressure and having a bleed orifice, a flapper valve, a support on which said valve is mounted for turning movements about a pivot toward and away from said orifice, first means for adjusting said support to move said pivot back and forth along a predetermined path on and in accordance with the expansion and contraction of said first chamber, and second means for turning said valve about said pivot on and in accordance with the expansion and contraction of said chamber, said valve support, nozzle and first and second means being so relatively arranged that the alternate movements toward and away from said orifice which the first and second means individually tend to give the valve, are in opposite directions and of slightly different magnitudes.

2. Pressure measuring apparatus as specified in claim 1, in which said first and second chambers are separated by a movable wall which forms the actuating element of said first means.

3. Pressure measuring apparatus as specified in claim 1, in which said first and second chambers are separated by a movable wall and in which said first means comprises a lever engaging and oscillated by said wall as the first chamber expands and contracts and in which said support comprises a pivot through which said valve is pivotally connected to said lever.

4. Pressure measuring apparatus as specified in claim 1, in which said second means comprises a pivoted deflecting element pivoted to turn about a fulcrum axis, a link having one end pivotally connected to said element at a distance from said fulcrum axis and having its other end connected to said support to turn about the same pivot about which said valve turns, and a second link connecting said valve and deflecting element and uniting with the first mentioned link to give said valve turning movements about said pivot similar to the turning moements of said deflecting element about its deflecting axis.

WALTER P. WILLS.

No references cited.